US012544898B2

(12) United States Patent
Schley et al.

(10) Patent No.: US 12,544,898 B2
(45) Date of Patent: Feb. 10, 2026

(54) QUICK CHANGE PNEUMATIC HAMMER

(71) Applicant: SCHLEY PRODUCTS INC., Anaheim, CA (US)

(72) Inventors: Chad Schley, Villa Park, CA (US); Jeff Marshall, Placentia, CA (US); Tim Hume, Orange, CA (US)

(73) Assignee: SCHLEY PRODUCTS, INC., Anaheim, CA (US)

( * ) Notice: Subject to any disclaimer, the term of this patent is extended or adjusted under 35 U.S.C. 154(b) by 0 days.

(21) Appl. No.: 18/124,750

(22) Filed: Mar. 22, 2023

(65) Prior Publication Data

US 2023/0219206 A1 Jul. 13, 2023

Related U.S. Application Data

(60) Continuation-in-part of application No. 17/115,588, filed on Dec. 8, 2020, now abandoned, which is a division of application No. 15/644,023, filed on Jul. 7, 2017, now abandoned, which is a division of (Continued)

(51) Int. Cl.

*B25D 17/00* (2006.01)
*B08B 1/16* (2024.01)
*B25B 13/08* (2006.01)
*B25B 21/02* (2006.01)
*B25B 23/00* (2006.01)

(Continued)

(52) U.S. Cl.

CPC ............ *B25D 17/005* (2013.01); *B08B 1/165* (2024.01); *B25B 13/08* (2013.01); *B25B 21/023* (2013.01); *B25B 23/0071* (2013.01); *B25D 17/02* (2013.01); *B25F 3/00* (2013.01); *B25D 2217/0007* (2013.01); *B25D 2250/111* (2013.01); *B25D 2250/295* (2013.01); *B25D 2250/345* (2013.01)

(58) Field of Classification Search

CPC .................. B25D 17/005; B25D 17/02; B25D 2250/111; B25D 2250/345; B25D 2250/295; B25D 2217/0007; B25B 19/00; B25B 21/023; B25B 23/0071; B25B 13/08; B25F 3/00; B08B 1/165; B25G 3/18

See application file for complete search history.

(56) References Cited

U.S. PATENT DOCUMENTS 2,224,063 A 12/1940 Roberts
2,715,347 A 8/1955 Johnson
2,761,478 A 9/1956 Guida (Continued)

FOREIGN PATENT DOCUMENTS

DE 19723056 C1 10/1998
FR 2670422 A3 6/1992

*Primary Examiner* — Thomas M Wittenschlaeger
(74) *Attorney, Agent, or Firm* — Stetina Garred Brucker & Newboles

(57) ABSTRACT

A pneumatic hammer extender arm assembly is provided comprising an elongated extender arm body defining a hammer engaging portion formed at a first end of the body, and a hammerhead engaging portion formed at a second end of the body. A hammerhead is detachably engageable to the hammerhead engaging portion to allow for quick change of the hammerhead without the need for any tools. The hammerhead may alternately be implemented to engage and apply an impact force to a fastener that may be axially offset from the extender arm body.

16 Claims, 7 Drawing Sheets

Related U.S. Application Data application No. 15/353,609, filed on Nov. 16, 2016, now abandoned.

(51) Int. Cl.

| | |
|---|---|
| ***B25D 17/02*** | (2006.01) |
| ***B25F 3/00*** | (2006.01) |

(56) References Cited

U.S. PATENT DOCUMENTS

| | | | | |
|---|---|---|---|---|
| 4,107,800 | A | 8/1978 | Jorgensen | |
| 4,624,323 | A | 11/1986 | Burrola | |
| 4,774,862 | A | 10/1988 | Scull | |
| 5,878,822 | A | 3/1999 | Roy | |
| 5,996,442 | A | 12/1999 | Carmien | |
| 6,186,032 | B1 | 2/2001 | Raines | |
| 6,938,961 | B2 | 9/2005 | Broom | |
| 7,841,261 | B2 | 11/2010 | Milligan et al. | |
| 7,942,426 | B2 | 5/2011 | Peters | |
| 8,353,230 | B2 | 1/2013 | Cole | |
| 8,602,285 | B2 | 12/2013 | Santamarina et al. | |
| 9,352,455 | B2 | 5/2016 | Steele et al. | |
| 10,040,176 | B2 | 8/2018 | Williams | |
| 10,307,895 | B2 | 6/2019 | Williams | |
| 10,759,027 | B2 | 9/2020 | Eggert et al. | |
| 2002/0178870 | A1* | 12/2002 | Lowther | B25B 27/02 81/27 |
| 2009/0056407 | A1* | 3/2009 | Greene | B25D 3/00 72/481.1 |
| 2012/0297937 | A1* | 11/2012 | Evans | B25B 13/04 81/177.1 |
| 2015/0336255 | A1 | 11/2015 | Chen | |
| 2017/0014980 | A1 | 1/2017 | Doroslovac et al. | |

* cited by examiner

QUICK CHANGE PNEUMATIC HAMMER

CROSS-REFERENCE TO RELATED APPLICATIONS

The present application is a continuation-in-part of U.S. patent application Ser. No. 17/115,588 entitled QUICK CHANGE PNEUMATIC HAMMER filed Dec. 8, 2020, which is a divisional patent application of U.S. patent application Ser. No. 15/644,023 entitled QUICK CHANGE PNEUMATIC HAMMER filed on Jul. 7, 2017, which is a divisional patent application of U.S. patent application Ser. No. 15/353,609 entitled QUICK CHANGE PNEUMATIC HAMMER filed on Nov. 16, 2016, the disclosures of which are incorporated herein by reference.

STATEMENT RE: FEDERALLY SPONSORED RESEARCH/DEVELOPMENT

Not Applicable

BACKGROUND

The present invention relates to accessories for impact hammers and, more particularly, to an extender arm assembly which extends the reach of an impact hammer to reach objects spaced from the impact hammer.

Impact hammers are used in a variety of fields, including but not limited to automotive repairs and maintenance. While the function and operation of such impact hammers is well recognized, the ability to communicate the force of an impact hammer to locations remote from the hammer may be limited. Moreover, where impact hammer extender arms are provided, they frequently are of a fixed length, and need to be replaced where the hammerhead becomes worn from extended use. Further, where different types of hammerheads are required for different applications, each hammerhead may be provided with a dedicated extender arm body, requiring replacement of the composite hammerhead, extender arm body, and hammer engaging portion, each time the hammerhead needs to be replaced.

The present invention is directed to a construction which addresses these limitations by providing a pneumatic hammer extender arm assembly wherein hammerheads and other utility apparatus may be manually attached and detached from the extender arm body, allowing for quick change thereof, without the need for tools. In other embodiments described herein, the extender arm body may be separately formed from a hammer engaging portion and the utility apparatus engaging portion. This permits a modular arrangement whereby the extender arm body can be separately replaced, such as to allow for different lengths of extender arm bodies, without the need to also replace the hammerhead, and/or the hammer engaging portion, or the hammerhead engaging portion.

In one embodiment disclosed herein, the extender arm body may be implemented as a conventional ratchet extension arm, engageable to the hammer engaging portion and the utility apparatus engaging portion, or directly to the hammerhead, without the need for tools, in a manner similar to which ratchet heads and ratchet arms extender are typically connected and disconnected.

BRIEF SUMMARY

A pneumatic hammer extender arm assembly is provided comprising an elongated extender arm body defining a hammer engaging portion formed at a first end of the body, and a utility apparatus engaging portion formed at a second end of the body. A hammerhead, a fastener engaging head, a scraper, or other utility apparatus is detachably engageable to the utility apparatus engaging portion to allow for quick change of the utility apparatus without the need for any tools.

In one embodiment, the utility apparatus engagement portion defines a resilient retaining member for resiliently retaining the hammerhead or other utility apparatus in engagement with the utility apparatus engaging portion during normal use.

The utility apparatus may also define a utility apparatus cavity formed therein for receiving and engaging the utility apparatus.

The utility apparatus cavity may define a cavity sidewall, which in turn defines a cavity recess for receiving and engaging the utility apparatus engaging portion resilient retaining member. The utility apparatus cavity may be formed as a cylindrical cavity defining a circumferential groove about the cavity for engaging the resilient retaining member.

The extender arm body may further define first and second stop portions, extending about the extender arm body adjacent the utility apparatus engaging portion and the hammer engaging portion, respectively. The first and second stop portions limit axial movement of the utility apparatus and the hammer, respectively, along the extender arm body.

In one embodiment the utility apparatus engaging portion and/or the hammer engaging portion are detachably engageable to the extender arm body independent of any fasteners.

The hammer engaging portion and the utility apparatus engaging portion may both be manually engageable to and disengageable from the body, independent of the use of any tools.

In another embodiment the extender arm body may define a first coupling member, mateably engageable to the utility apparatus engaging portion, and the extender arm body may define a second coupling member, mateably engageable to the hammer engaging portion. In such embodiment, both the hammer engaging portion and the utility apparatus engaging portion are implemented as structures separate from the extender arm body. As such, the extender arm body may be implemented as a conventional ratchet extension arm, detachably engageable to the hammer engaging portion and/or the utility apparatus engaging portion. In such embodiment, the length of the extender arm body may be selected by selecting the length of a conventional extension arm, thereby enhancing the flexibility and efficiency of the present invention.

In another embodiment, the utility apparatus may be formed as a fastener engaging head, manually engageable to the body. The fastener engaging head may define a fastener engaging portion and a fastener impact surface. The fastener engaging head is functional to engage the fastener to facilitate rotation of a remote fastener and/or impart an axial force to the fastener, along the fastener surface.

In yet another embodiment, the utility apparatus may be formed as a scraper assembly, manually engageable to the body. The scraper assembly may define a scraper assembly engaging portion and a blade. The scraper assembly blade engaging portion is functional to engage the utility apparatus engaging portion and the blade to impart an axial scraping force to a surface in response to translation of the hammer.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The above description is given by way of example, and not limitation. Given the above disclosure, one skilled in the art could devise variations that are within the scope and spirit of the invention disclosed herein, including various ways of forming and connecting the components of the pneumatic hammer extender arm assembly described herein. Further, the various features of the embodiments disclosed herein can be used alone, or in varying combinations with each other and are not intended to be limited to the specific combination described herein. Thus, the scope of the claims is not to be limited by the illustrated embodiments.

Figure 1:
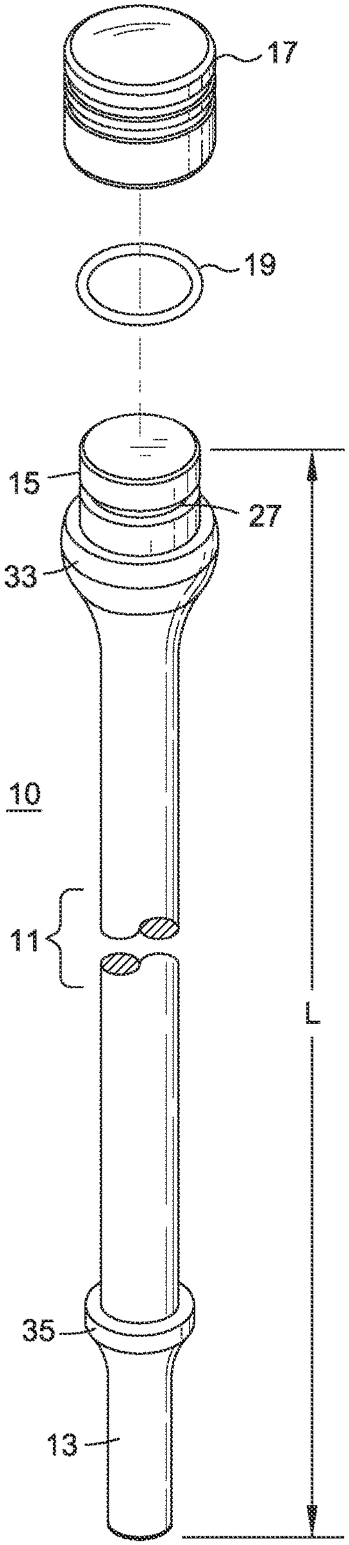
FIG. 1 is an exploded view of one embodiment of the pneumatic hammer extender arm assembly including a hammerhead utility apparatus.

Referring to FIG. 1 of the drawings, an exemplary embodiment of a pneumatic hammer extender form assembly, is illustrated. The exemplary pneumatic hammer extender arm assembly 10 includes an elongated extender on body 11, which defines a hammer engaging portion 13, formed at a first end of the body, and a utility apparatus engaging portion 15 (shown as a hammerhead engaging portion), formed at the second end of the body. The hammerhead 17 is detachably engaged to the hammerhead engaging portion 15, as further described below.

Figure 2:
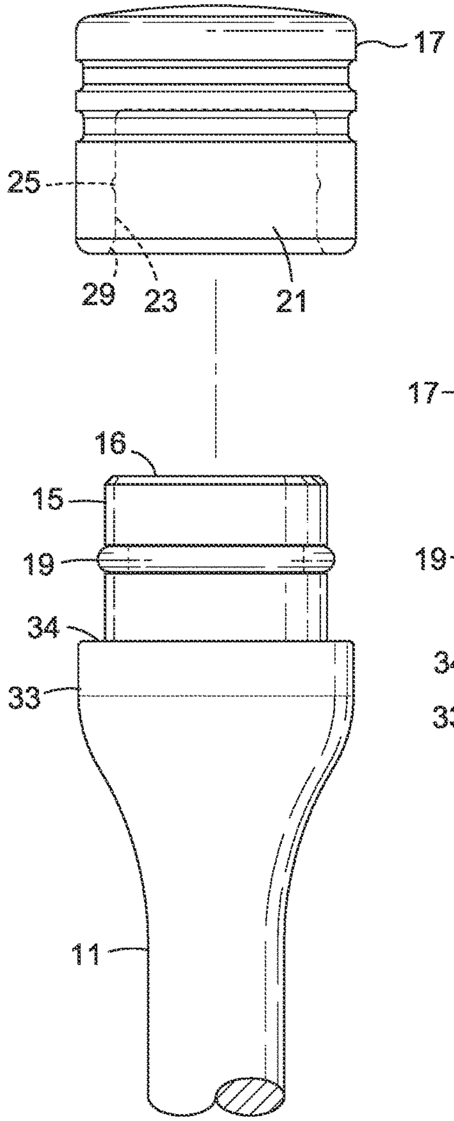
FIG. 2 is an exploded view of the of the hammerhead and the hammerhead engaging portion shown in FIG. 1.

As further illustrated in FIG. 2, the hammerhead 17 defines a hammerhead cavity 21 formed therein. The cavity 21 includes cavity sidewalls 23 and a recess 25. In the illustrated embodiment, the recess 25 is formed as a circumferential groove extending about the sidewall 23 of the cavity 21. The cavity 21 may further define a beveled edge surface 29, to facilitate receiving the hammerhead engaging portion 15.

Figure 3:
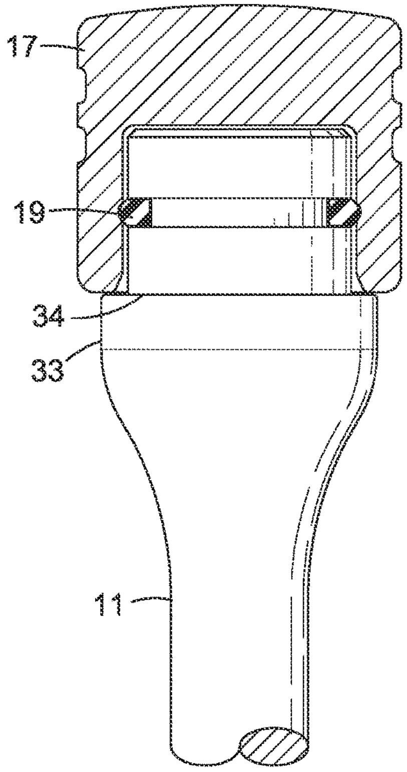
FIG. 3 is a view of the hammerhead retainingly engaged to the hammerhead engaging portion.
Figure 4A:
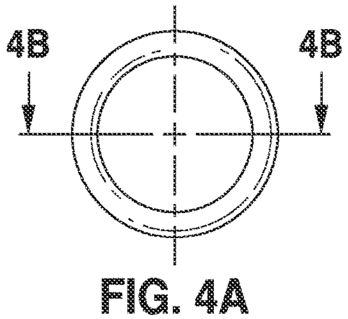
FIG. 4A is a top view of the resilient retaining member.
Figure 4B:
FIG. 4B is a sectional view of the resilient retaining member.
Figure 5:
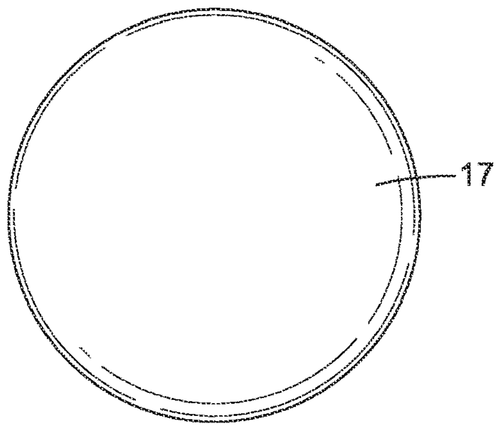
FIG. 5 is a top view of the hammerhead.
Figure 6:
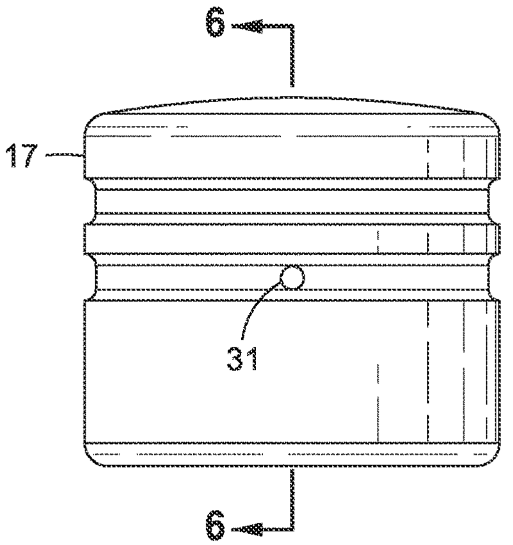
FIG. 6 is a side view of the hammerhead.
Figure 7:
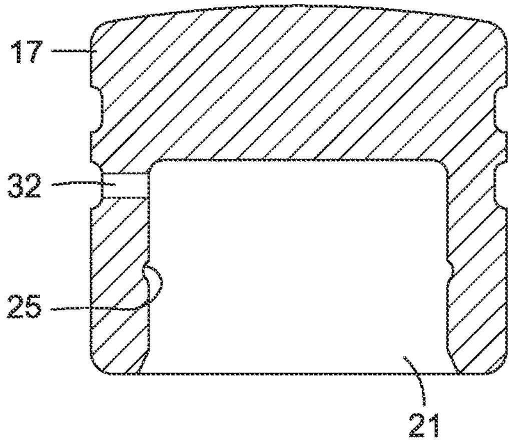
FIG. 7 is a side sectional view of the hammerhead.
Figure 8:
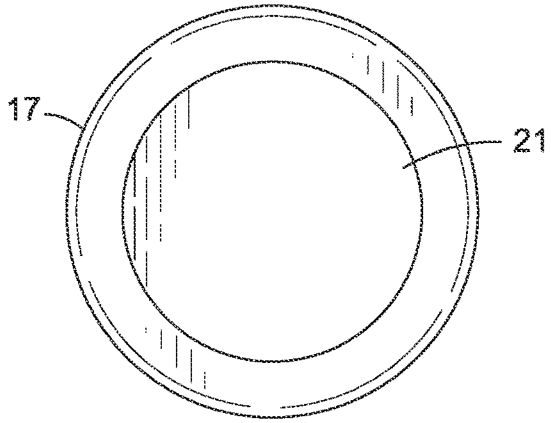
FIG. 8 is a bottom view of the hammerhead.

As further shown in FIGS. 1-3, the hammerhead engaging portion 15 further defines a groove 27, formed to receive a resilient retaining member 19. When the hammerhead 17 is mateably engaged to the hammerhead engaging portion 15, the resilient retaining member 19 is received by and retained within circumferential groove 25 formed in the hammerhead 17.

In the present embodiment, the resilient retaining member 19 is formed as an "O" ring which mateably engages groove 25 of hammerhead 17, as described above. However, it is anticipated that the resilient member 19 may be alternately formed as one or more retractable projections that are engageable with one or more mating recesses formed in the hammerhead 17.

As further shown in FIGS. 1-3, the extender arm body 11 further defines stop portions 33 and 35. Stop portion 33 is disposed proximate a lower surface of the hammerhead 17, in substantial abutting relationship therewith. As such, the stop portion 33 limits axial travel of the hammerhead 17 relative to the body 11 when the hammer extender arm assembly is in use.

As those with ordinary skill in the art will recognize, the diameter and the axial length of the hammerhead engaging portion 15, the hammerhead cavity 21, and the first stop portion 33 may be selected so that the hammerhead engaging portion 15 is securely retained within the hammerhead 17. Hammerhead 17 and the hammerhead engaging portion 15 may be manually engaged and disengaged, without the need for tools, while remaining in engagement during normal operation of the hammer extender arm assembly and hammer. Further, the diameter of the stop portion 33 may be formed to define an impact surface 34, which communicates an impact force to the hammerhead 17 in response to reciprocation of the body 11. Alternatively/additionally, the impact force may be communicated to the hammerhead 17 along impact surface 16, formed on the hammerhead engaging portion 15.

FIGS. 4-8 provide additional views of an exemplary hammerhead in accordance with the present invention. As shown therein, hammerhead 17 may be provided with a vent hole 31 and vent passage 32, to provide a means for allowing air to pass into or out of the hammerhead cavity 21, as the hammerhead is engaged or disengaged from the utility apparatus engaging portion 15.

Figure 9:
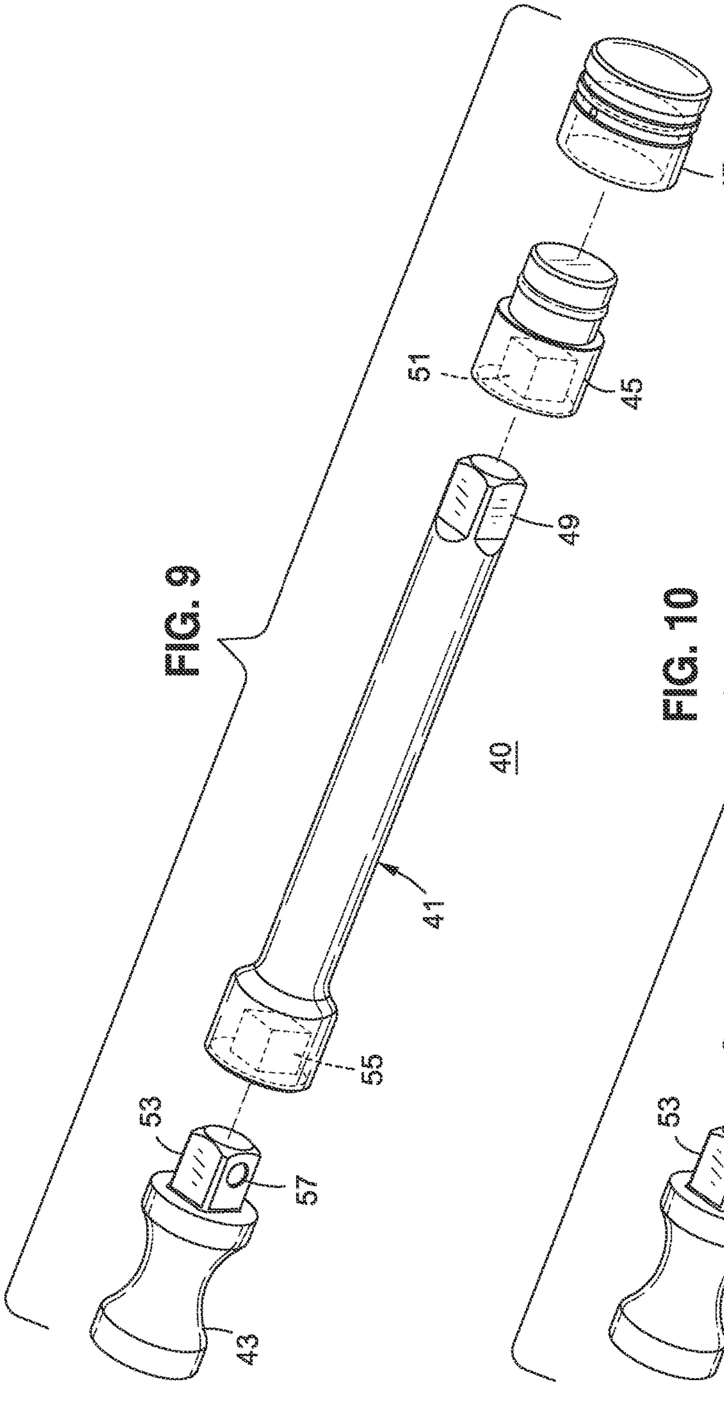
FIG. 9 is an exploded view of a second embodiment of the pneumatic hammer extender arm assembly.

FIG. 9 illustrates an alternate embodiment of the invention wherein the elongated extender arm body is defined separate from the hammer engaging portion and the utility apparatus (hammerhead) engaging portion. As shown therein, pneumatic hammer extender arm assembly 40 comprises an elongated extender arm body 41, hammer engaging portion 43, hammerhead engaging portion 45, and hammerhead 47. The elongated extender arm body 40 defines a first coupling member 55, there implemented as a recess of a prescribed depth formed in the extender arm body 41. The extender arm body 41 further defines a second coupling member 49, there implemented as a protrusion extending from the extender arm body 40. The first coupling member 55 is formed for mating engagement with protrusion 53, formed on the hammer engaging portion 43 and having a length exceeding the depth of the recess defined by the first coupling member 55. Protrusion 53 may further be provided with a resilient detent 57, which allows for mating engagement with the corresponding recess (not shown) within first coupling member 55.

Second coupling member 49 is engageable with cavity 51 formed in hammerhead engaging portion 45. The protrusion defined by second coupling member 49 and cavity 51 are sized for mating engagement, the length of the protrusion exceeding the depth of cavity 51. Hammerhead 47 is engageable to hammerhead engaging portion 45, as previously described.

In the embodiment shown in FIG. 9, the extender arm body 41 is formed as a conventional ratchet extension, and the hammer engaging portion 43 and hammerhead engaging portion 45 define mating structures which are sized and shaped to cooperatively engage the ratchet extension. As such, the extender arm body 41 may be manually engaged and disengaged from both the hammer engaging portion 43 and the hammerhead engaging portion 45 without the need for tools. Moreover, the construction of the pneumatic hammer extender arm assembly 40 allows the present invention to be compatible with different sized ratchet extender bodies, thereby providing greater affordability and flexibility.

It will be understood by those skilled in the art that the orientation of extender arm body 41 may be reversed where, for example, the protrusion 53 is provided on the hammerhead engaging portion 45, and the cavity 51 is provided on the hammer engaging portion 43. It will also be recognized that the first and second coupling members, as well as the mating structures on the hammer engaging portion 43 and the hammerhead engaging portion 45 may vary in size and shape without departing from the broader spirit and scope of the present invention.

Figure 10:
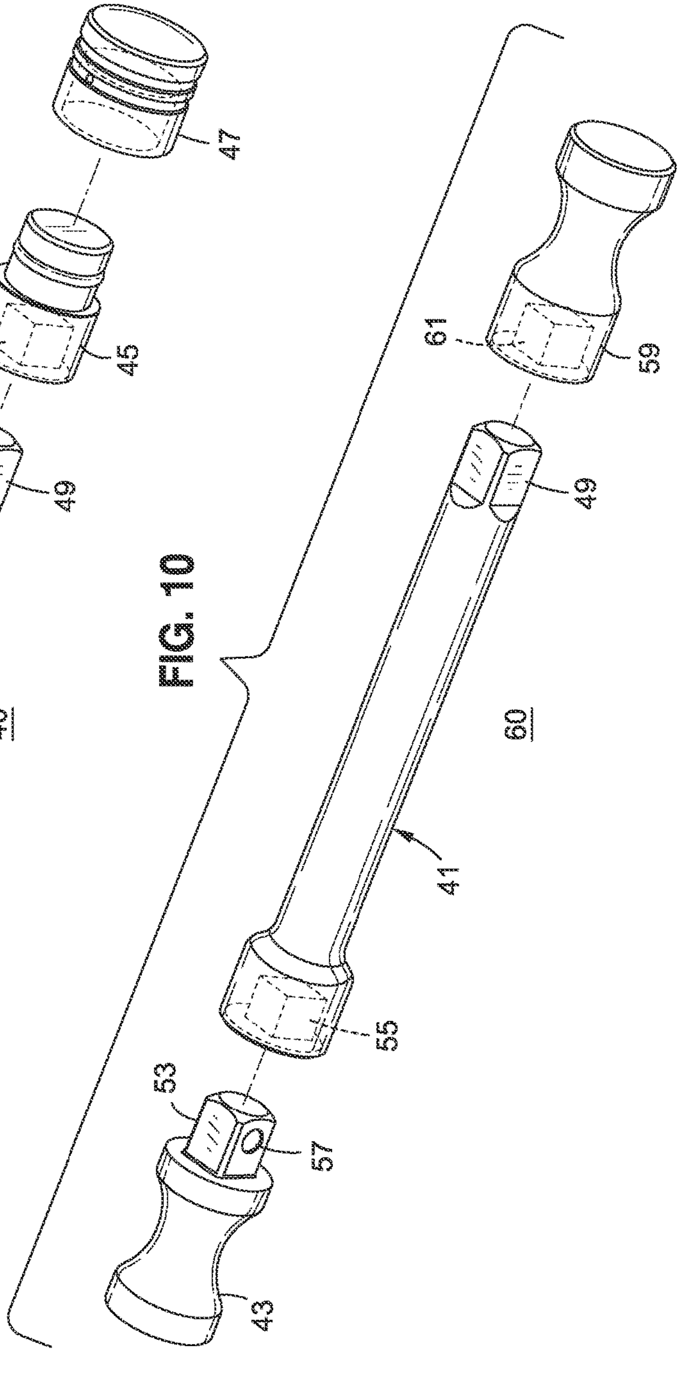
FIG. 10 is an exploded view of a third embodiment of the pneumatic hammer extender arm assembly.
Figure 11:
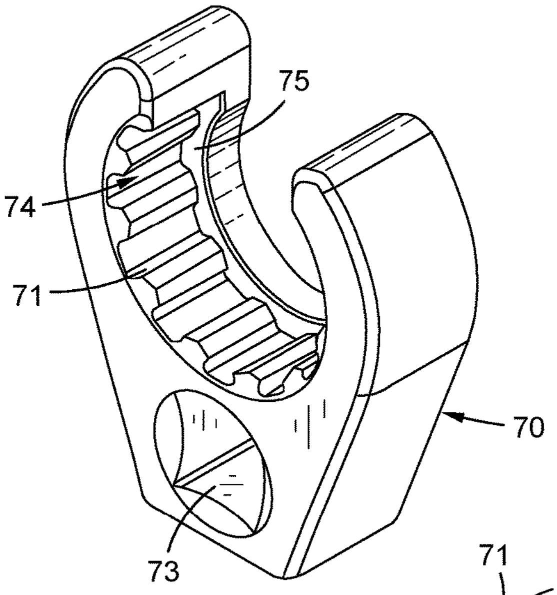
FIG. 11 is a perspective view of an alternative utility apparatus for engaging and impacting fasteners.
Figure 12:
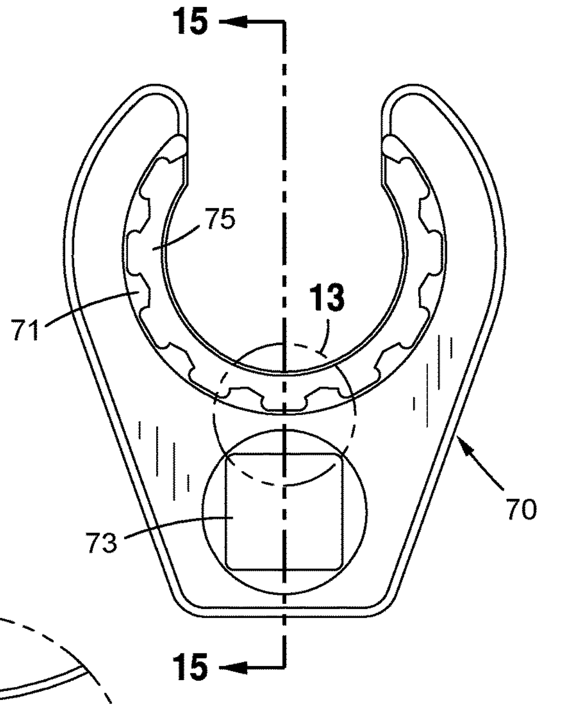
FIG. 12 is a top view of the embodiment shown in FIG. 11.
Figure 13:
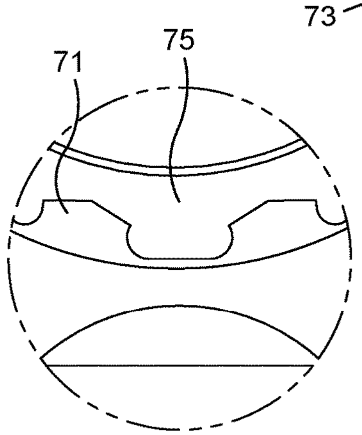
FIG. 13 is an enlarged sectional view of the embodiment shown in FIG. 11.
Figure 14:
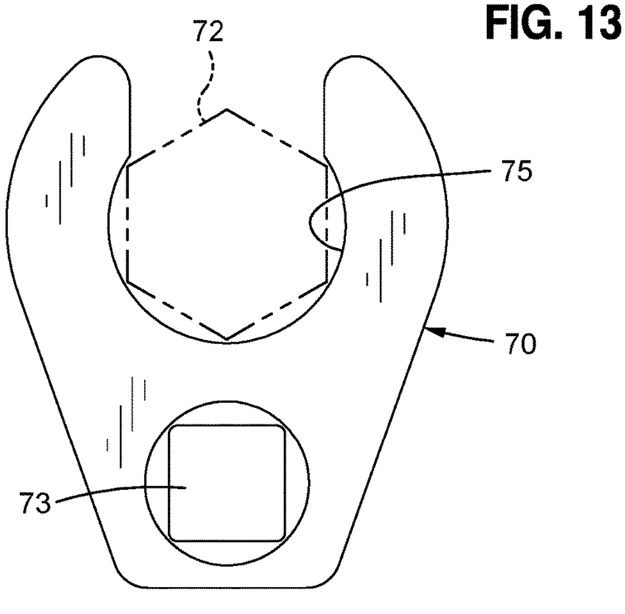
FIG. 14 is a bottom view of the embodiment shown in FIG. 11.
Figure 15:
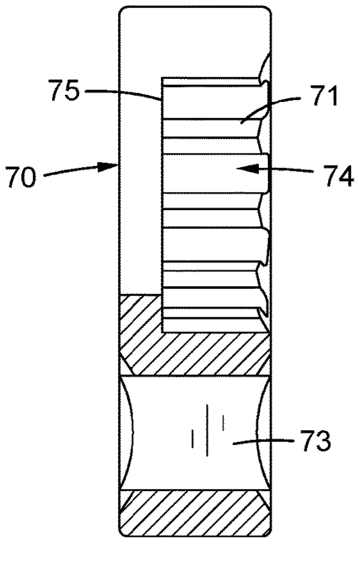
FIG. 15 is a side sectional view of the embodiment shown in FIG. 11.

FIG. 10 describes an alternate embodiment of the hammerhead extender arm assembly. As shown therein, hammerhead extender arm assembly 60 is constructed such that the hammerhead 59 engages directly to the extender arm body 41. In that embodiment, the protrusion defined by second coupling member 49 defines the hammerhead engaging portion, engageable to cavity 61 of hammerhead 59, the length of the protrusion exceeding the depth of cavity 61. As such, a separate hammerhead engaging member is not necessary. Moreover, as the hammerhead 59 and the hammer engaging portion 43 are substantially the same, they may be reversed upon reversing the orientation of the extender arm body 41. This embodiment further allows use of a conventional ratchet extender arm for the extender arm body 41, providing further economy and flexibility. As with the prior embodiments, the assembly 60, shown in FIG. 10, allows for manual engagement and disengagement of the extender arm body from the hammerhead and the hammer engaging member, without the need for mechanical tools.

FIGS. 11-15 illustrate the construction of an exemplary fastener retention head, which may be used in conjunction with the extender arm body 41, shown in FIGS. 9 and 10. The fastener engaging head 70 includes fastener engaging portion 71 and a fastener impact surface 75. The fastener engaging head 70 further includes a cavity 73, sized to engage coupling member 49 of the elongated body 41, as shown in FIGS. 9 and 10. In use, the fastener engaging head 70 may receive a fastener 72 inserted within the engaging head 70, in a direction 74, such that the fastener abuts against surface 75 of the fastener impact head 70. Rotation of the extender arm body 41 about the fastener causes the fastener to tighten or loosen. Axial translation of the impact head 70, in response to movement of the impact hammer, directs an axial force onto the fastener along the surface 75 of engaging head 70. As one of ordinary skill will recognize, the fastener engaging head 70 is formed to be compatible with a conventional ratchet on extender, as described above.

Figure 16:
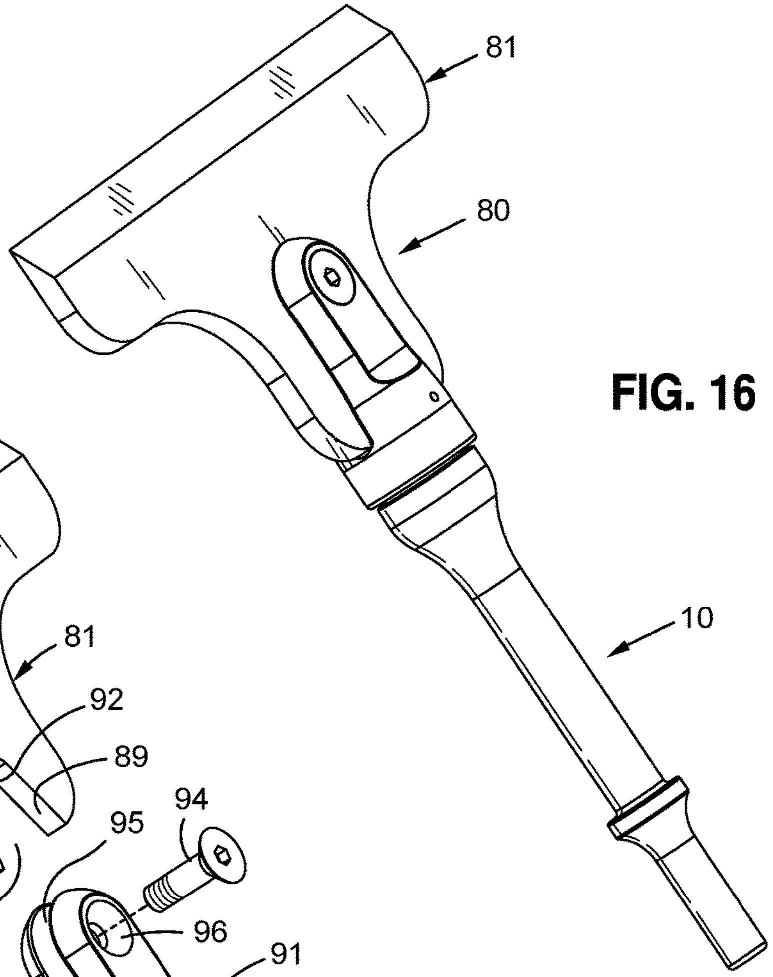
FIG. 16 is a perspective view of an alternate embodiment including a scarper assembly utility apparatus.
Figure 17:
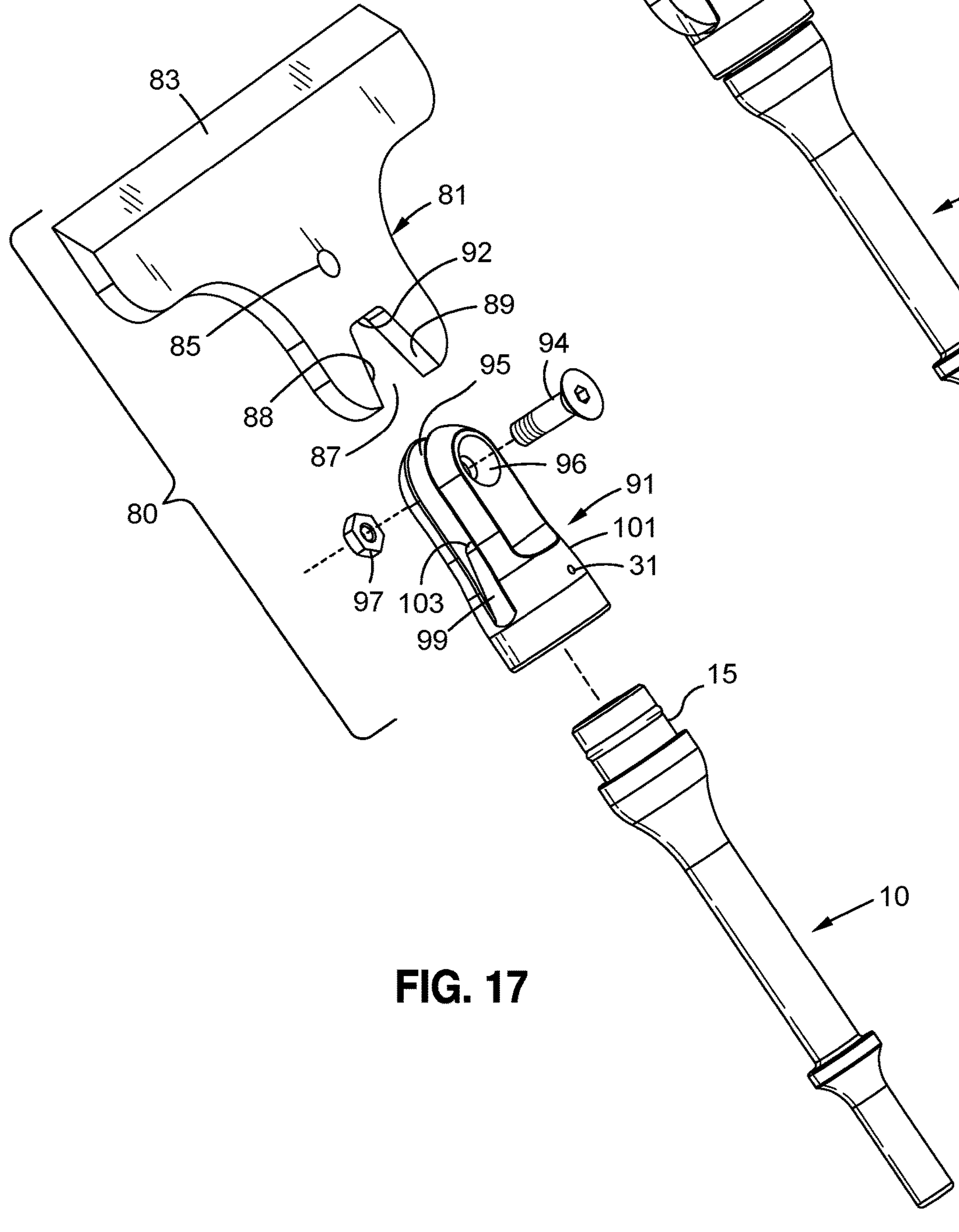
FIG. 17 is an exploded view of the embodiment shown at FIG. 16.

FIGS. 16 and 17 illustrate an alternate embodiment of the pneumatic hammer extender arm assembly wherein the extender arm body is engaged to a scraper arm assembly utility apparatus. As with the prior embodiments, the scraper arm assembly 80 is formed to be detachably engageable to the extender arm 10. The scraper arm assembly 80 includes scraper blade 81 and scraper blade support member 91. The scraper blade 81 is shown in more detail at FIGS. 18, 19A and 19B. The scraper blade support member 91 is shown in more detail at FIGS. 20A-20C and 21A-21D.

Figure 18:
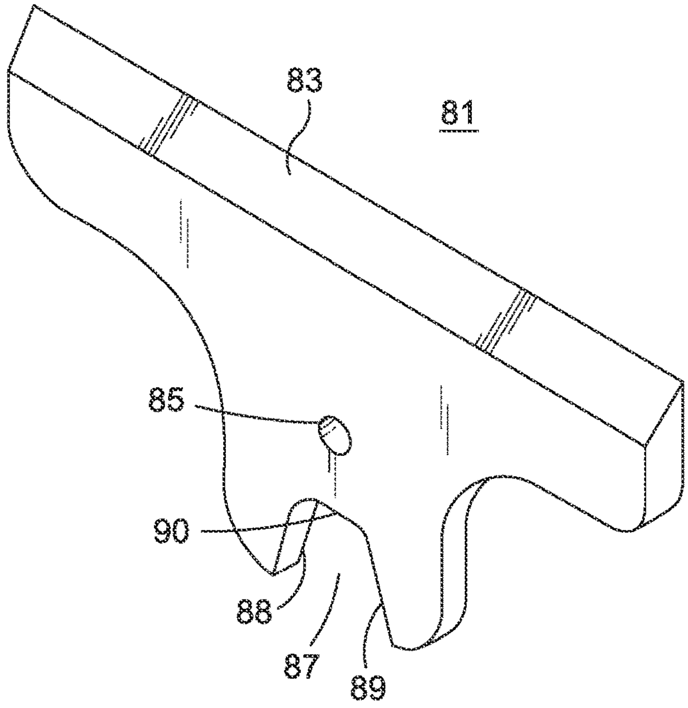
FIG. 18 is a perspective view of the scraper.
Figure 19A:
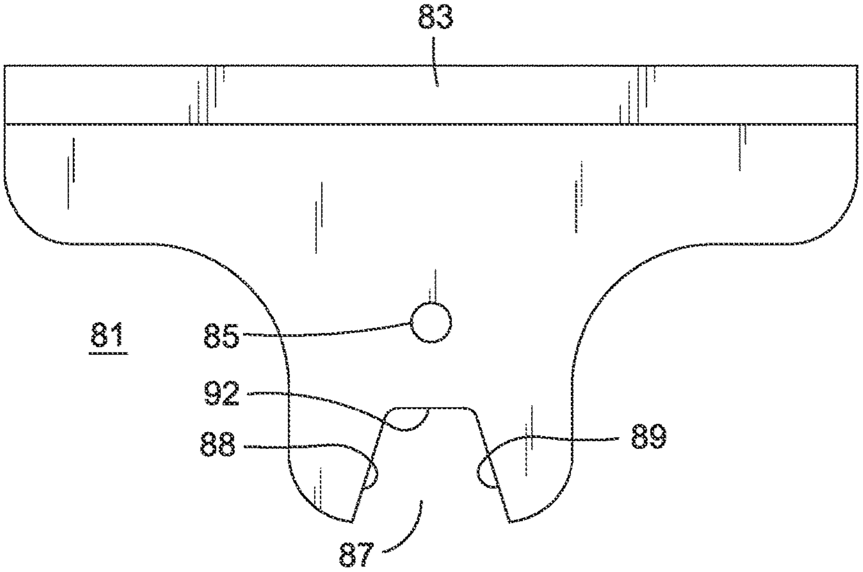
FIG. 19A is top view of the scraper.
Figure 19B:
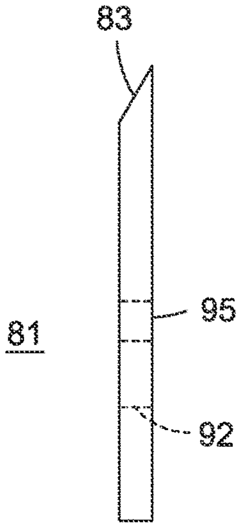
FIG. 19B is a side view of the scraper.
Figure 20A:
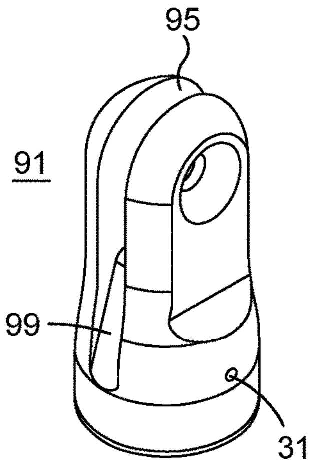
FIG. 20A is a front perspective view of the scraper retaining member.
Figure 20B:
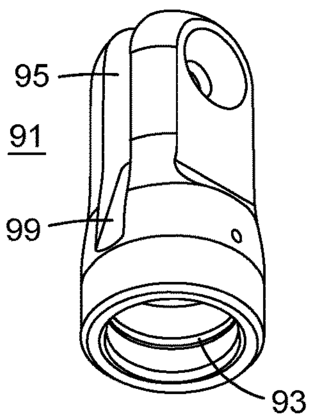
FIG. 20B is a bottom perspective view of the scraper retaining member.
Figure 20C:
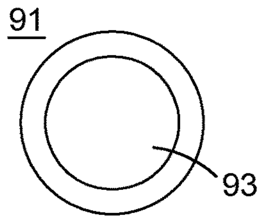
FIG. 20C is a bottom view of the scraper retaining member.
Figure 21A:
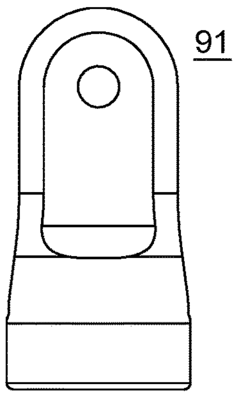
FIG. 21A is a front view of the scraper retaining member.
Figure 21B:
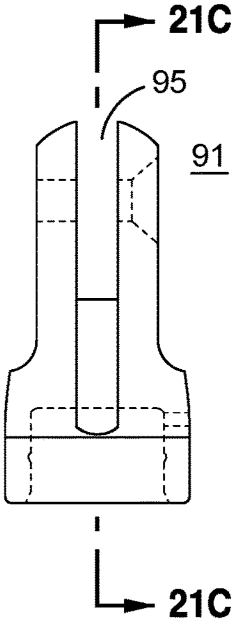
FIG. 21B is a side view of the scraper retaining member.
Figure 21C:
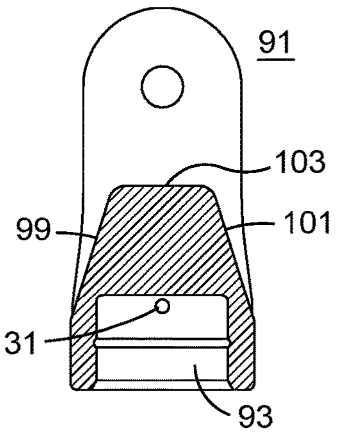
FIG. 21C is a front sectional view of the scraper retaining member.
Figure 21D:
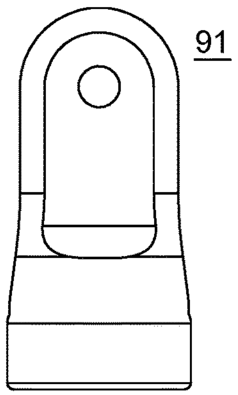
FIG. 21D is a rear view of the scraper retaining member.

Referring to FIG. 17, the scraper blade 81 includes a scraper blade surface 83 for scraping the surface in response to axial movement of the extender arm 10. The scraper blade 81 further defines a tapered aperture 87, which defines sidewalls 88, 89, and seating surface 92. The scraper blade 81 further defines a scraper blade fastener retaining aperture 95, through which fastener 93 extends, as described further below. Further details regarding the construction of the scraper blade 81 are shown at FIGS. 18, 19A, and 19B.

Referring again to FIG. 17, scraper blade support member 91 is shown to be connectable to the scraper blade 83 and to the extender arm 10. Additional details of the scraper blade support member 91 are shown at FIGS. 20A-20C and 21A-21D. Referring to FIGS. 17, 20A-20C and 21A-21D, the scraper support member 91 defines a cavity 93 for receiving and detachably engaging the extender arm utility apparatus engaging portion 15. As such, the blade support member 91 engages the extender arm utility apparatus engaging portion 15 in the same manner in which the hammerhead 17 engages engaging portion 15, as described in connection with FIGS. 1-3.

The scraper blade support member 91 further defines a receiving cavity 95 which defines a scraper blade support member seating surface 103, and opposing first and second scraper blade support member tapered sidewalls 99, 101, extending rearwardly and outwardly from the scraper blade support member seating surface 103. As it will be clear from the figures, the scraper blade seating surface at 92, and scraper blade sidewalls 88, 89, are formed to substantially complement scraper blade support member seating surface 103 and scraper blade support member sidewalls 99, 101. As a result, the scraper blade is engageable to the scraper blade support member in a manner such that the scraper blade sidewalls extend in substantially abutting relation with the scraper blade support member sidewalls, and the scraper blade seating surface extends in substantially abutting relation with the scraper blade support member seating surface. As a result, the axial impact force communicated between the scraper blade support member 91 and the scraper blade 81 is communicated along the interface of scraper blade support member seating surface 103, and scraper blade seating surface 92.

As one of ordinary skill will recognize, the scraper blade may be subject to a torque or rotational force as it scrapes along the surface, due to the irregularity of the surface. However, the abutting engagement of the scraper blade sloped sidewalls 88, 89 and the scraper blade support member sidewalls 99, 101 provide lateral support that opposes any rotation of the scraper blade 81 relative to the scraper blade support member 91, thereby maintaining the scraper blade in a normal orientation relative to the extender arm 10 as the scraper blade is in use.

Scraper blade support member 91 further defines a fastener receiving aperture 96, which is disposed in a vertical registry with the scraper fastener receiving aperture 85, when the scraper 81 is engaged to the scraper support member 91. Fastener 94 extends through the apertures 85, 96, and retaining nut 97 to secure the scraper blade 81 to the scraper blade support member 91.

As one of ordinary skill will recognize, the engagement of the seating surface and sidewalls of the scraper blade, to the seating surface and sidewalls of the scraper blade support member, functions to provide axial and rotational support for the scraper blade assembly 80. As such, the fastener 93 does not have to bear the impact or rotational load communicated between the scraper blade 81 and the scraper blade support member 91. This provides greater durability of the scraper blade assembly 80, as the fastener 93 need not be put under substantial load to maintain integrity of the assembly.

In one embodiment of the scraper blade assembly 80, the angle between the slope of the scraper blade sidewalls 88, 89, may be slightly greater than the slope of the scraper blade support member sidewalls 99, 101, to allow for easier assembly of the scraper blade and the scraper blade support member. In such an embodiment, any rotation of the scraper blade 81, relative to the scraper blade support member 91, would be limited to the small angular difference between the slope of the scraper blade sidewalls and the slope of the scraper blade support member sidewalls.

As noted above, the present invention may be implemented in alternative constructions, which allow for engagement to an impact hammer, or a hammerhead of various types and sizes, depending upon the particular application.

What is claimed is:

1. A fastener impact assembly used for applying an impact force to a fastener and comprising:

- an extender arm body including a first coupling member which is on a first end thereof and comprises a recess of a prescribed depth, and a second coupling member on a second end thereof opposite the first end and comprising a coupling member protrusion of a prescribed length;
- a hammer engaging member including a hammer protrusion on a first end thereof which is of a length exceeding the depth of the recess defined by the first coupling member, the hammer engaging member being formed to be releasably engageable to the first coupling member of the extender arm body through the advancement of the hammer protrusion into the recess; and
- a hammerhead engaging member including a second end defining a generally planar engaging member impact surface sized and shaped to be struck by an impact tool, and further including a cavity within a first end thereof which is opposite the second end and of a prescribed depth less than the length of the coupling member protrusion, the hammerhead engaging member being formed to be releasably engageable to the second coupling member of the extender arm body through the advancement of the coupling member protrusion into the cavity.

2. The fastener impact assembly as recited in claim 1 wherein the hammer protrusion has a cross-sectional shape which is complementary to that of the recess of the first coupling member.

3. The fastener impact assembly as recited in claim 2 wherein the hammer protrusion includes a resiliently movable member protruding therefrom which is frictionally engageable to a corresponding interior surface defined by the recess.

4. The fastener impact assembly as recited in claim 1 wherein the hammer engaging member includes a second end which is opposite the first end and defines an impact surface.

5. The fastener impact assembly as recited in claim 1 wherein the cavity has a cross-sectional shape which is complementary to the coupling member protrusion of the second coupling member.

6. The fastener impact assembly as recited in claim 1 further comprising a hammerhead which is releasably engageable to the second end of the hammerhead engaging member, the hammerhead defining a generally planar hammerhead impact surface sized and shaped to be struck by an impact tool.

7. The fastener impact assembly as recited in claim 6 wherein:

- a portion of the hammerhead engaging member proximate the first end thereof is of first diameter, and a portion of the hammerhead engaging member proximate the second end thereof is of second diameter less than the first diameter; and
- the hammerhead defines a cavity having a size and shape which is complementary to, and adapted to releasably receive, the portion of the hammerhead engaging member which is of the second diameter.

8. The fastener impact assembly as recited in claim 7 wherein:

- the portion of the hammerhead engaging member which is of the second diameter includes a continuous circumferential groove which is formed therein and partially accommodates an O-ring therein; and
- the cavity of the hammerhead includes a continuous circumferential groove which is formed in an interior wall defined thereby and adapted to partially receive the O-ring when the portion of the hammerhead engaging member which is of the second diameter is advanced into the cavity of the hammerhead.

9. A fastener impact assembly used for applying an impact force to a fastener and comprising:

- an extender arm body including a first coupling member which is on a first end thereof and comprises a recess of a prescribed depth, and a second coupling member on a second end thereof opposite the first end and comprising a coupling member protrusion of a prescribed length;
- a hammer engaging member including a hammer protrusion on a first end thereof which is of a length exceeding the depth of the recess defined by the first coupling member, the hammer engaging member being formed to be releasably engageable to the first coupling member of the extender arm body through the advancement of the hammer protrusion into the recess; and
- a hammerhead including a second end defining a generally planar impact surface sized and shaped to be struck by an impact tool, and further including a cavity within a first end thereof which is opposite the second end and of a prescribed depth less than the length of the coupling member protrusion, the hammerhead being formed to be releasably engageable to the second coupling member of the extender arm body through the advancement of the coupling member protrusion into the cavity.

10. The fastener impact assembly as recited in claim 9 wherein the hammer protrusion has a cross-sectional shape which is complementary to that of the recess of the first coupling member.

11. The fastener impact assembly as recited in claim 10 wherein the hammer protrusion includes a resiliently movable member protruding therefrom which is frictionally engageable to a corresponding interior surface defined by the recess.

12. The fastener impact assembly as recited in claim 9 wherein the hammer engaging member includes a second end which is opposite the first end and defines an impact surface.

13. The fastener impact assembly as recited in claim 9 wherein the cavity has a cross-sectional shape which is complementary to the coupling member protrusion of the second coupling member.

14. A fastener impact assembly used for applying an impact force to a fastener and comprising:

an extender arm body including a coupling member comprising a coupling member protrusion of a prescribed length;

a hammerhead engaging member including a cavity within a first end thereof which is of a prescribed depth less than the length of the coupling member protrusion, the hammerhead engaging member being formed to be releasably engageable to the coupling member of the extender arm body through the advancement of the coupling member protrusion into the cavity; and a hammerhead which is releasably engageable to a second end of the hammerhead engaging member which is opposite the first end thereof, the hammerhead defining a generally planar impact surface sized and shaped to be struck by an impact tool.

15. The fastener impact assembly as recited in claim 14 wherein:

a portion of the hammerhead engaging member proximate the first end thereof is of first diameter, and a portion of the hammerhead engaging member proximate the second end thereof is of second diameter less than the first diameter; and the hammerhead defines a cavity having a size and shape which is complementary to, and adapted to releasably receive, the portion of the hammerhead engaging member which is of the second diameter.

16. The fastener impact assembly as recited in claim 15 wherein:

the portion of the hammerhead engaging member which is of the second diameter includes a continuous circumferential groove which is formed therein and partially accommodates an O-ring therein; and the cavity of the hammerhead includes a continuous circumferential groove which is formed in an interior wall defined thereby and adapted to partially receive the O-ring when the portion of the hammerhead engaging member which is of the second diameter is advanced into the cavity of the hammerhead.

* * * * *